United States Patent [19]

Andersson et al.

[11] Patent Number: 4,895,697
[45] Date of Patent: Jan. 23, 1990

[54] TOP SUPPORT LOCK

[75] Inventors: Patrik Andersson, Västerfärnebo; Anders Wallander, Västeras, both of Sweden

[73] Assignee: ABB Atom AB, Västerås, Sweden

[21] Appl. No.: 248,931

[22] Filed: Sep. 26, 1988

[30] Foreign Application Priority Data

Sep. 28, 1987 [SE] Sweden ................................. 8703719

[51] Int. Cl.$^4$ ................................................. G21C 3/32
[52] U.S. Cl. .................................... 376/434; 376/446; 376/448
[58] Field of Search ................. 376/448, 446, 434, 261

[56] References Cited

U.S. PATENT DOCUMENTS

| | | | |
|---|---|---|---|
| 4,304,635 | 12/1981 | Lippert et al. | 376/448 |
| 4,526,744 | 7/1985 | Borrman et al. | 376/446 |
| 4,540,545 | 9/1985 | Kondo | 376/434 |
| 4,707,328 | 11/1987 | Arbink et al. | 376/448 |

*Primary Examiner*—Daniel Wasil
*Attorney, Agent, or Firm*—Watson, Cole, Grindle & Watson

[57] ABSTRACT

To allow manipulation of the fuel assemblies in a nuclear reactor, the assemblies are provided with a lifting handle at the upper end. A top support is provided at the lifting end of the fuel assembly to determine the spacing. An upper end portion of the fuel channel for the fuel assemblies surrounds a lifting plate or the like for the fuel rods, where the lifting plate and handle together may form a lifting member cast in one piece. To simplify manipulation of the fuel assemblies during fuel inspection, for instance, and reduce the risk of losing small parts, a top support lock (1) for the top support (2) has been constructed in the handle (3). When assembling the top support (2), the top support lock (1) is moved to its open position and the angle-piece ends (5) are inserted through recesses (8) in the fuel channel (7) up to the openings (4) in the handle (3). When the angle-piece ends (5) of the top support are in place, the holes (6) in the angle-piece ends will be immediately opposite the holes (4) in the handle (3) and the top support lock (1) is moved to its closing position by a spring (13). With a good fit between the top support and the openings in the fuel channel and in the handle, the top support will be accurately positioned and firmly secured. When the top support is to be dismantled, the top support lock (1) is moved to its open position and the top support (2) is removed from openings (4, 8) in the handle and fuel channel.

1 Claim, 2 Drawing Sheets

TOP SUPPORT LOCK

TECHNICAL FIELD

The present invention relates to a top support lock for positioning and locking a top support for the lifting handle of a nuclear fuel assembly.

BACKGROUND ART

To allow manipulation of the fuel assemblies in a nuclear reactor, the assemblies are usually provided with a lifting handle or the like. The fuel rods in the assemblies are surrounded by a fuel channel. A top support may be provided in conjunction with the fuel channel at the lifting side, in order to maintain constant spacing between adjacent fuel assemblies. Alternatively the top support may be arranged to retain and position the fuel channel in relation to the lifting part. U.S. Pat. No. 4,707,328, describes and illustrates the design and arrangement of a top support, passing through the fuel channel and being secured to the fuel channel and to the lifting handle. Through-holes for screws are provided in the angle-piece ends of the top support. When the top support is in place it is screwed to the handle by a screw passing through said holes. Alternatively a loose locking pin with bajonet catch may be used, fitted into a groove electro-erosion machined in the handle.

DISCLOSURE OF THE INVENTION

To simplify manipulation of the fuel assemblies during fuel inspection, for instance, and reduce the risk of losing small parts, a top support lock has been designed which is both simpler and less expensive to manufacture since electro-erosion machining of the bayonet groove is eliminated. The task of the top support lock 1 is to secure a top support 2 to the handle 3 of the fuel assembly, the lock 1 and the handle 3 constituting a unit. With the top support 2 in place, the lock 1 prevents the support 2 from slipping out of recesses 4, 8 in the handle 3 and in the fuel channel 7 of the fuel assembly. The lock is secured in its locked position by a spring 13 fitted on a shaft 12. When dismantling the top support 2, for a fuel inspection, for instance, the top support 2 is released by moving the lock 1 back against the action of the spring 13, to its open position. The lock comprises four parts: cylinder 11, shaft 12, spring 13 and stop 14. The cylinder 11 governs locking in the hole 15 in the handle 3, the shaft 12 connects the cylinder 11 with the stop 14, and the spring 13 surrounds the shaft 12. When the stop 14 has been connected to the shaft 12 after assembly of the cylinder 11, shaft 12 and spring 13, the lock 1 has been secured in the handle 3.

DESCRIPTION OF AN EMBODIMENT

Figure 1:
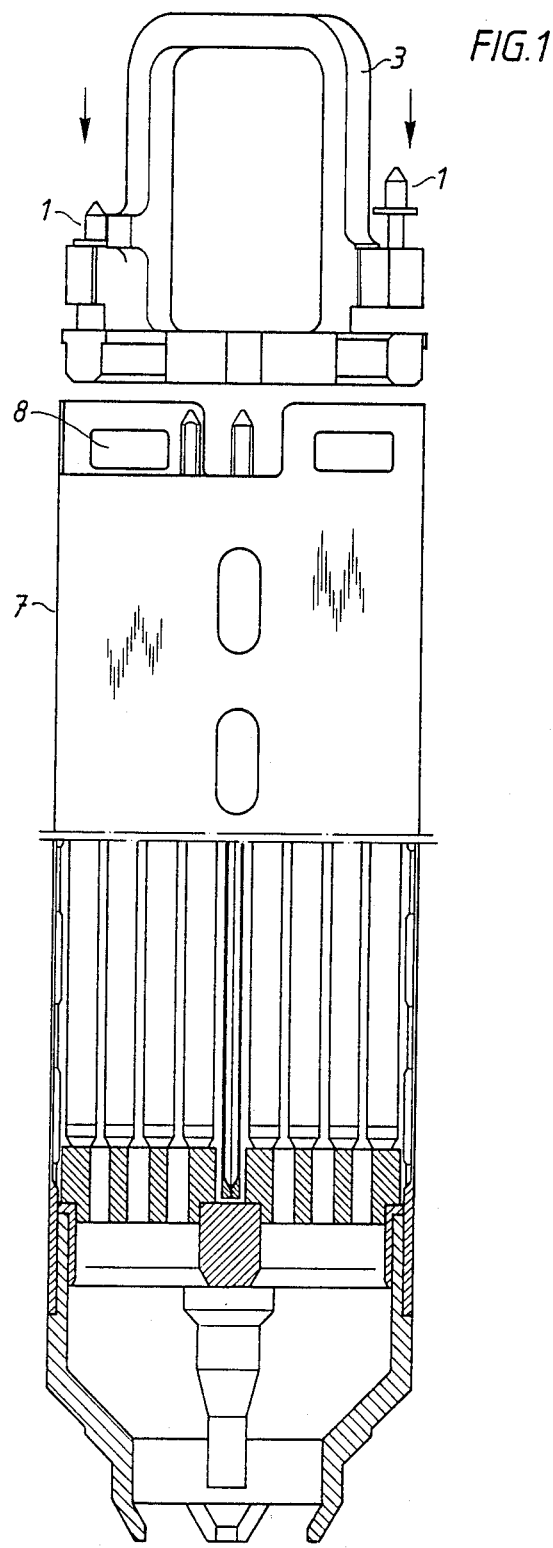
FIG. 1 shows from the side how a handle is fitted onto a fuel assembly.
Figure 2:
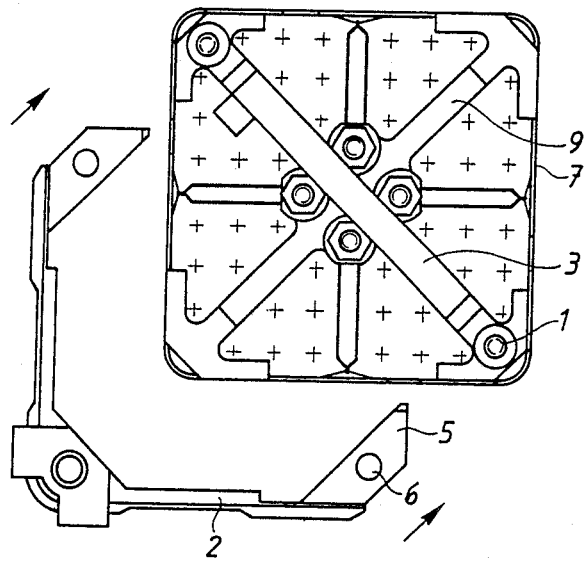
FIG. 2 shows from above how a top support is fitted on to the fuel assembly, with the handle in position.
Figure 3:
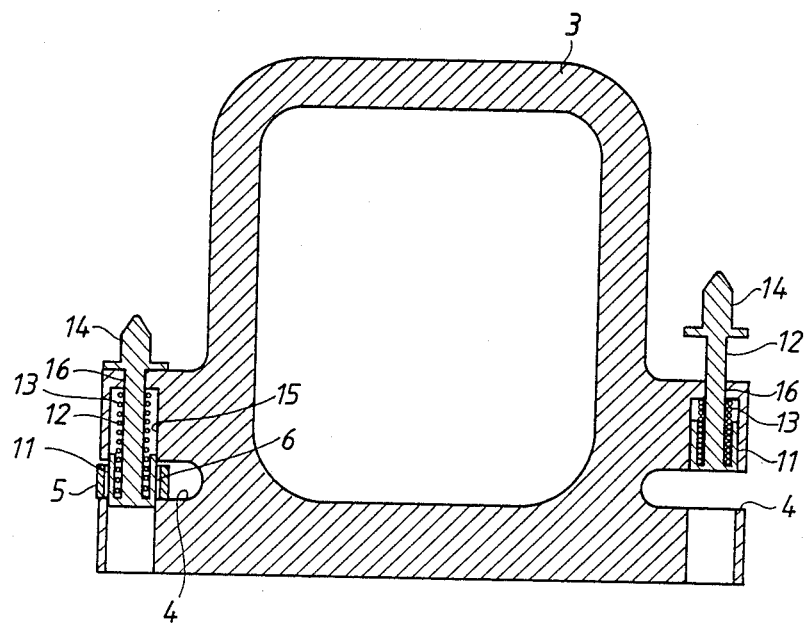
FIG. 3 shows in section from the side how a top support lock according to the invention is constructed in the handle of the fuel assembly.

A top support lock according to the invention is designed for use with the nuclear fuel assembly for a nuclear reactor in which the fuel assembly is provided with fuel channel, top support and lifting handle.

The bottom of the fuel channel, having substantially square cross section, connects with an upper, square section of a bottom portion provided with a downwardly directed inlet opening for coolant and moderator water. A support plate is also located on the bottom portion. The lower part of the wall of the fuel channel is detachably connected to the bottom portion and the support plate by a plurality of radially directed bolts. The fuel channel may be divided by a channel member having cruciform cross section, into four axially directed tube portions.

The channel member may be welded to the four walls of the fuel channel, for instance, by its four hollow wings. The channel member is connected at the bottom to an inlet pipe for moderator water. Each tube portion contains a bundle of e.g. sixteen fuel rods. Each bundle also includes a gridlike bottom plate, a gridlike top plate and a plurality of spacers. The four bottom plates are carried by the support plate. In each bundle, one of the fuel rods is provided with relatively long end plugs provided with screw threading, the lower end plug passing through the bottom plate and being provided with a nut, and the upper end plug passing through the top plate and being provided with a nut. An upper end section of the fuel channel surrounds a cruciform lifting plate with four radially directed arms extending from a common central portion. Each arm is provided with an arrow-shaped piece at the outermost end, connecting with an inner corner of the fuel channel. The lifting handle 3 is secured to the arms. The lifting plate 9 and handle 3 can together form a lifting member cast in one piece out of steel, for instance.

Radial recesses 8 are provided at the ends of the arms in the fuel channel 7, said recesses being arranged symmetrically about a diagonal plane. The upper end of the fuel channel lies substantially in the same plane. The ends of the arms may be provided on their upper sides with flanges, each resting on a corner of the fuel channel. Four through-holes are provided in the central area of the lifting plate, for securing the fuel channel.

The top support 2, designed to maintain constant spacing between adjacent fuel assemblies, is arranged at the upper edge of the fuel channel 7. The top support 2 also has the task of retaining and positioning the fuel channel 7 in relation of the lifting plate 9 with the handle 3. The top support 2 may be substantially angular, and be arranged at the ends to connect them with the lifting member 3.

When assembling the top support 2, its angle-piece ends, or top-support fingers 5, are inserted through the openings 8, the radial recesses, in the fuel channel, which are arranged to fit the angle-pieces passing through them well. The top support is placed so that the attachment holes 6 in the angle-piece ends will align with corresponding holes 4 and arrangements 1 in the lifting member 3, while the rest of the top support 2 is arranged to fit the outer sides of the fuel channel. When the top support 2 is in position, it is secured to the lifting member 3. Thus when abutting the outer side of the fuel channel 7 and passing through the openings 8 therein, it will also be secured to the fuel channel 7. When the top support is in position and is secured to the lifting handle, lifting plate and fuel channel, the entire fuel assembly can be lifted by the handle.

To achieve a reliable connection between top support and handle, which is easy to assemble and to dismantle, a top support lock 1 is arranged in the handle 3. A hole 6 is arranged in the top support finger 5 (angle-piece end), fitting a corresponding pin-shaped movable part in the handle 3. This pin-shaped part consists essentially of a cylinder 11 having one open end and one closed end. A shaft 12 is arranged in the open end, connected to the closed end. A compression spring 13 is arranged around the shaft 12. The opposite end of the shaft is arranged to pass through a corresponding guide hole 16 in the handle 3, opposite hole 15 in the handle for the cylindrical part 11 of the pin-shaped part.

When the pin-shaped part 11 is in position in the hole 15 in the handle 3, and the compression spring 13 is arranged around the shaft, between the cylinder side of the pin-shaped part and the guide hole 16 in the handle, the free end of the shaft is provided with a hat-like stop means 14. The compression spring 13 around the shaft 12 will force the pin-shaped part 11 towards the open recess 4 for the top support finger 5 and, when the top support 2 is in place, will lock and secure this to the handle. The dimension of the hole in the top support finger and that of the pin-shaped part should be selected with the best possible fit to ensure that securing and locking are excellent. Holes for the pin-shaped cylinder part 11 are provided on both sides of the opening 4 for the top support finger, so that in its inserted position the ends of the cylinder part 11 be in place in the holes on both sides of the opening when the top support finger is in place, and that the region between the ends is in the hole 6 in the top support finger 5.

When the top support 2 is to be assembled, the top support lock 1 is lifted with the hat-like stop device 14 and the top support finger 5 is inserted in the corresponding opening 4 in the handle 3. When the opening 6 in the top support finger is opposite the pin-shaped part 11 of the top support lock 1, the compression spring 13 is allowed to force the pin 11 out of the hole 15 in the handle 3, through the opening 6 in the top support finger 5 (equivalent) to a hole on the other side of the finger in the handle. When the top support 2 is to be dismantled, the top support lock 1 is lifted to its fully retracted position, whereupon the top support finger 5 can be withdrawn from the opening 4 in the handle 3.

We claim:

1. In a nuclear assembly having a lifting handle, said assembly comprising:

a fuel channel having an upper end section which surrounds a lifting plate;

a top support which is substantially angluar and arranged with openings at angle-piece ends to connect said ends to the lifting handle, the lifting handle being provided with openings for receiving the angle-piece ends of the top support and openings perpendicular to said lifting handle openings; and means for positioning and locking the top support, said means comprising a movable, spring-loaded cylindrical portion arranged to fit corresponding openings in the angle-piece ends of the top support, said cylindrical portion having one open and one closed end, the latter being joined to a shaft, said shaft being partially surrounded by a compression spring, said spring acting between the cylindrical portion and an end wall of the handle, said shaft passing for guidance through a hole in the lifting handle and being provided outside the handle with a stop means.

* * * * *